United States Patent [19]
Hiller et al.

[11] Patent Number: 5,694,959
[45] Date of Patent: Dec. 9, 1997

[54] REMOVABLE TRAY FOR A WALKER

[76] Inventors: John S. Hiller; Henry J. Hiller, both of 28428 Fig Ct., Saugus, Calif. 91350

[21] Appl. No.: 769,753

[22] Filed: Dec. 20, 1996

[51] Int. Cl.⁶ .................................................. A45B 3/00
[52] U.S. Cl. .................................................. 135/66; 135/67
[58] Field of Search ........................ 135/65, 66, 67; 297/5, 6; 224/281, 42.32, 42.4

[56] References Cited

U.S. PATENT DOCUMENTS

| | | | |
|---|---|---|---|
| 4,251,044 | 2/1981 | Olson | 135/67 |
| 4,676,416 | 6/1987 | Harmon | 135/67 X |
| 4,708,274 | 11/1987 | Roche | 135/67 X |
| 4,974,620 | 12/1990 | Quillan et al. | |
| 5,217,032 | 6/1993 | Jobst | |
| 5,224,506 | 7/1993 | Allen et al. | |
| 5,273,063 | 12/1993 | Farr et al. | 135/66 |
| 5,353,824 | 10/1994 | Woods et al. | 135/66 |

*Primary Examiner*—Lanna Mai

[57] ABSTRACT

A removable tray for a walker including a walker having a pair of spaced upper side bars. Further provided are a pair of walker coupling mechanisms adapted to be coupled to an associated side bar of the walker via clamps. A tray is slidably coupled to the walker coupling mechanism such that only lateral relative movement is allowed prior to use. Finally, at least one flexible strip is coupled at a first end thereof to the tray for coupling about at least one of the side bars of the walker to preclude lateral movement of the tray during use.

3 Claims, 3 Drawing Sheets

REMOVABLE TRAY FOR A WALKER

BACKGROUND OF THE INVENTION

1. Field of the Invention

The present invention relates to a removable tray for a walker and more particularly pertains to allowing coupling of a tray to walkers with various widths and further precluding movement of the tray during use.

2. Description of the Prior Art

The use of walker trays is known in the prior art. More specifically, walker trays heretofore devised and utilized for the purpose of retrofitting trays to walkers are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 5,217,032 to Jobst; U.S. Pat. No. 5,273,063 to Farr et al. U.S. Pat. No. Des. 305,015 to Roche; U.S. Pat. No. 4,830,243 to Mann; U.S. Pat. No. 4,708,274 to Roche; and U.S. Pat. No. 4,659,099 to Malone.

In this respect, the removable tray for a walker according to the present invention substantially departs from the conventional concepts and designs of the prior art, and in so doing provides an apparatus primarily developed for the purpose of allowing coupling of a tray to walkers with various widths and further precluding movement of the tray during use.

Therefore, it can be appreciated that there exists a continuing need for a new and improved removable tray for a walker which can be used for allowing coupling of a tray to walkers with various widths and further precluding movement of the tray during use. In this regard, the present invention substantially fulfills this need.

SUMMARY OF THE INVENTION

In view of the foregoing disadvantages inherent in the known types of walker trays now present in the prior art, the present invention provides an improved removable tray for a walker. As such, the general purpose of the present invention, which will be described subsequently in greater detail, is to provide a new and improved removable tray for a walker which has all the advantages of the prior art and none of the disadvantages.

To attain this, the present invention essentially comprises a walker with a pair of spaced upper side bars each with a leg depend from each end thereof. As shown in FIG. 1, the walker further has a front cross bar coupled between one pair of legs in perpendicular relation with the upper side bars. As best shown in FIG. 4, a pair of walker coupling mechanisms are included. Each walker coupling mechanism has a top face with a rectangular configuration. A pair of side faces are integrally coupled to opposite edges of the tray and depend downwardly therefrom. As such, the walker coupling mechanisms define an inverted U-shaped configuration. An oval tab is situated above the top face with a post coupled between the tab and the top face. Situated on an outer surface of each of the side faces is a pair of spaced pile fasteners. Each walker coupling mechanism further has a pair of spaced clamps each with an inverted U-shaped configuration. Preferably, the clamps are screwably coupled at an apex thereof to the top face between the side faces of the walker coupling mechanisms. By this structure, each walker coupling mechanism is adapted to be coupled to an associated side bar of the walker via the clamps. Further provided is a tray with a rectilinear configuration having a pair of long edges and a pair of short edges coupled therebetween. The tray further has a pair of lips integrally coupled to a corresponding long edge of the tray and further depending downwardly therefrom. As best shown in FIG. 5, the tray has a tray coupling mechanism including a pair of plates situated below the tray adjacent the short edges thereof. A periphery of the plates is coupled between an outboard edge and side edges of the corresponding plate and a lower surface of the tray. Each plate has rectangular cut out with a width equivalent to a diameter of the post of the walker coupling mechanism. As shown in FIG. 2, the tray further includes a pair of spaced flexible strips coupled at a first end thereof to a corresponding short edge of the tray. A pile fastener is situated on a second end of each of the strips.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved removable tray for a walker which has all the advantages of the prior art walker trays and none of the disadvantages.

It is another object of the present invention to provide a new and improved removable tray for a walker which may be easily and efficiently manufactured and marketed.

It is a further object of the present invention to provide a new and improved removable tray for a walker which is of a durable and reliable construction.

An even further object of the present invention is to provide a new and improved removable tray for a walker which is susceptible of a low cost of manufacture with regard to both materials and labor, and which accordingly is then susceptible of low prices of sale to the consuming public, thereby making such removable tray for a walker economically available to the buying public.

Still yet another object of the present invention is to provide a new and improved removable tray for a walker which provides in the apparatuses and methods of the prior art some of the advantages thereof, while simultaneously overcoming some of the disadvantages normally associated therewith.

Still another object of the present invention is to allow coupling of a tray to walkers with various widths and further preclude movement of the tray during use.

Lastly, it is an object of the present invention to provide a new and improved removable tray for a walker including a walker having a pair of spaced upper side bars. Further provided are a pair of walker coupling mechanisms adapted to be coupled to an associated side bar of the walker via clamps. A tray is slidably coupled to the walker coupling mechanism such that only lateral movement is allowed prior to use. Finally, at least one flexible strip is coupled at a first end thereof to the tray for coupling about at least one of the side bars of the walker to preclude lateral movement of the tray during use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
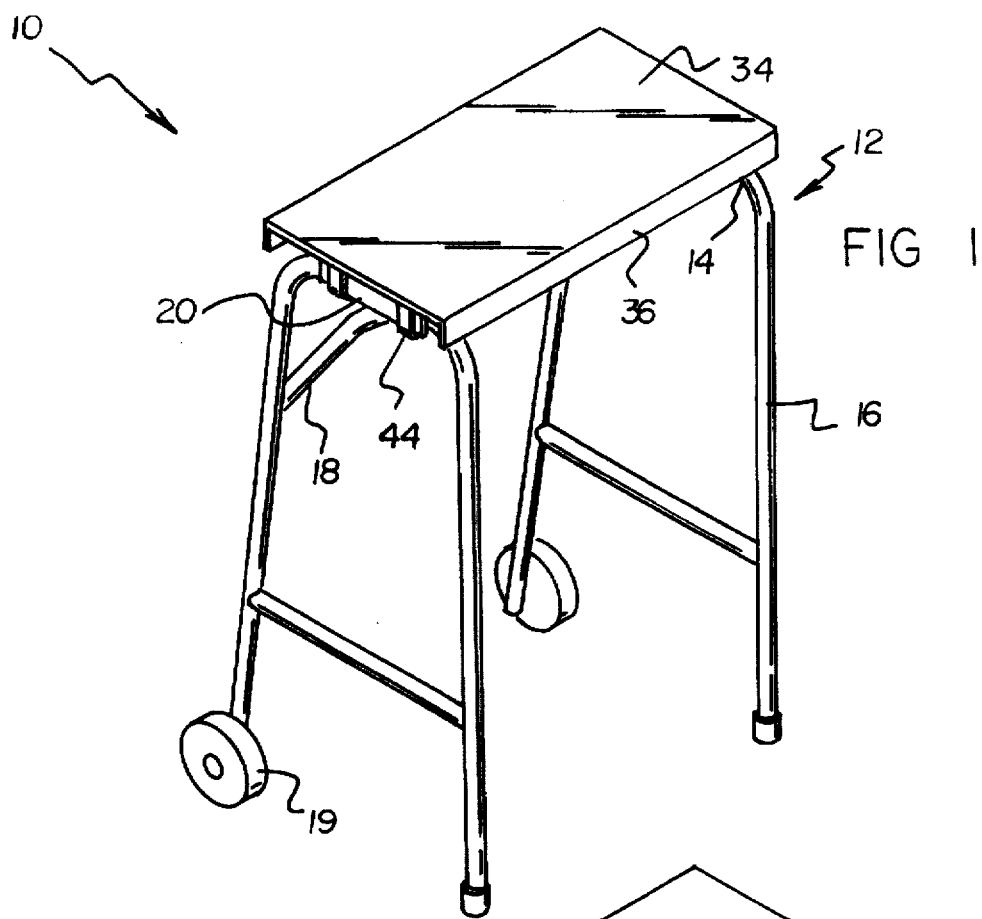
FIG. 1 is a perspective illustration of the preferred embodiment of the removable tray for a walker constructed in accordance with the principles of the present invention.

With reference now to the drawings, and in particular to FIG. 1 thereof, a new and improved removable tray for a walker embodying the principles and concepts of the present invention and generally designated by the reference numeral 10 will be described.

The present invention, the new and improved removable tray for a walker, is comprised of a plurality of components. Such components in their broadest context include a walker, a pair of walker coupling mechanisms, a tray, and a pair of tray coupling mechanisms. Such components are individually configured and correlated with respect to each other so as to attain the desired objective.

More specifically, it will be noted that the system 10 of the present invention includes a walker 12 with a pair of spaced upper side bars 14 each with a leg 16 depending from each end thereof. As shown in FIG. 1, the walker further has a front cross bar 18 coupled between one pair of legs in perpendicular relation with the upper side bars. As an option, a pair of lower side bars may be coupled between the legs for improved stability. Ideally, the walker has a pair of wheels 19 rotatably coupled to a bottom end of two of the legs.

Figure 4:
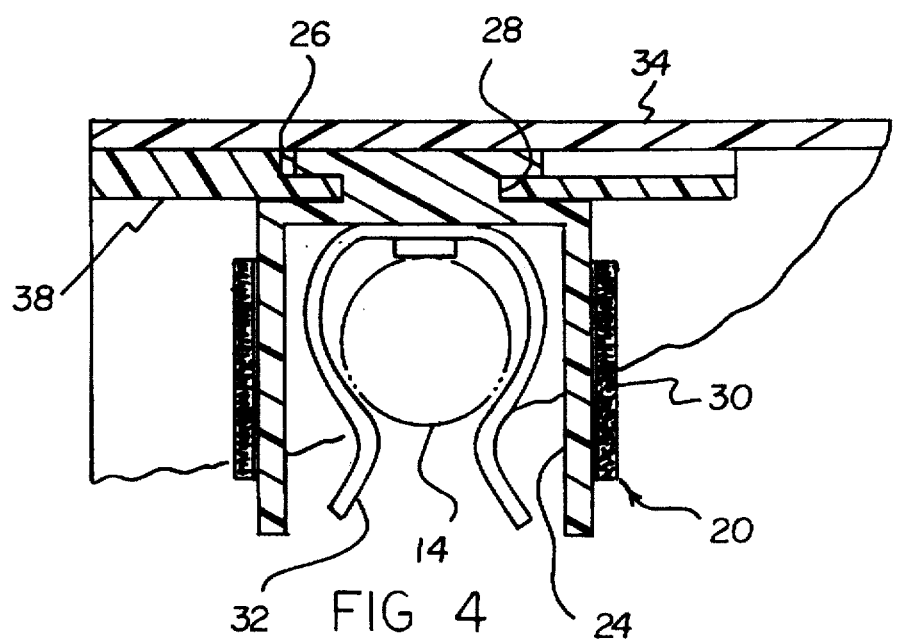
FIG. 4 is a cross-sectional view of the present invention taken along line 4—4 shown in FIG. 3.
Figure 5:
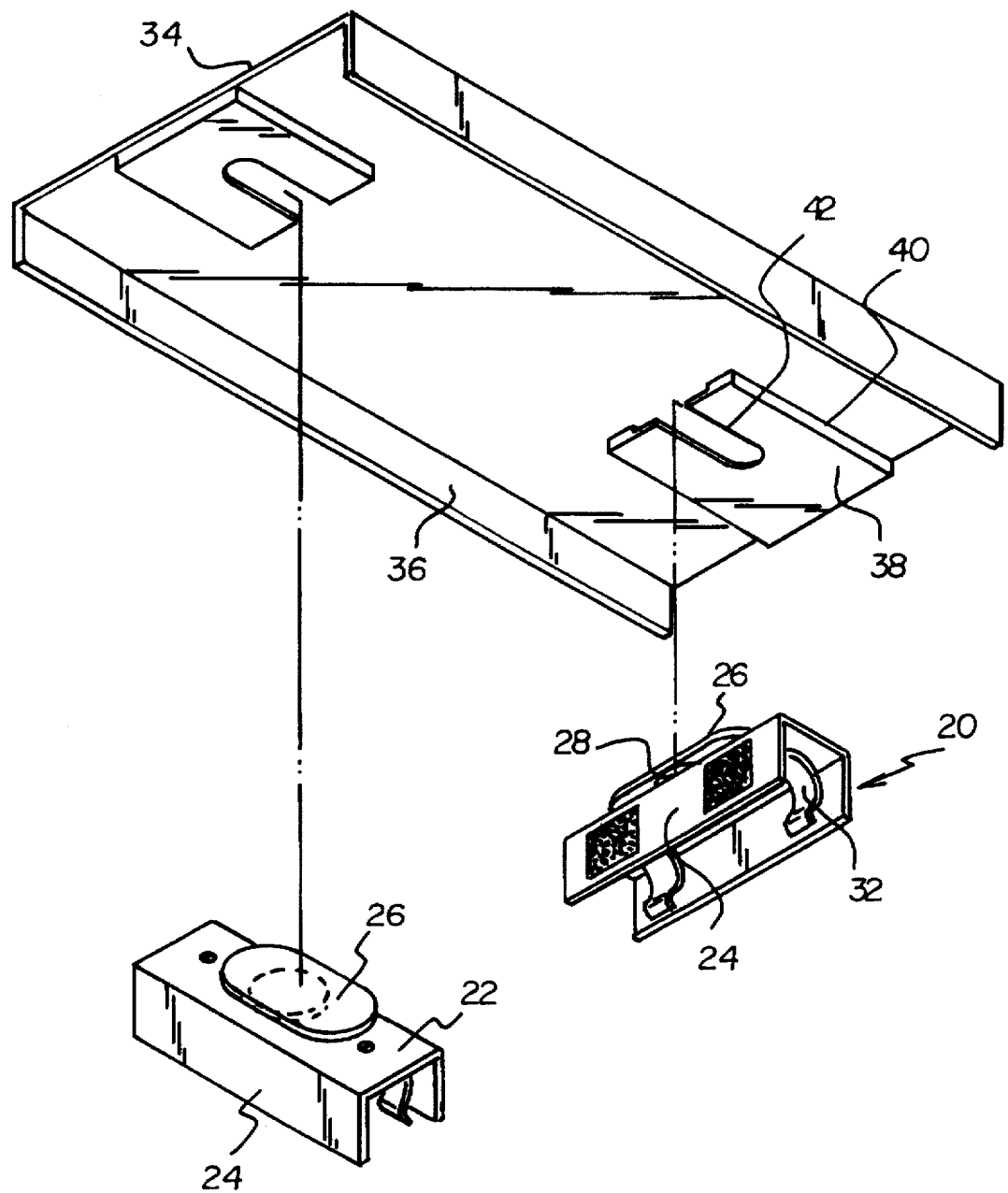
FIG. 5 is an exploded view of the present invention.

As best shown in FIG. 4, a pair of walker coupling mechanisms 20 are included. Each walker coupling mechanism has a top face 22 with a rectangular configuration. A pair of side faces 24 are integrally coupled to opposite long edges of each of the walker coupling mechanisms and depend downwardly therefrom. As such, the walker coupling mechanisms define an inverted U-shaped configuration. An oval tab 26 is situated above each top face with a post 28 coupled between the tab and the top face. Preferably, the oval tabs include wings which reside directly above the top face for at least ½ the length thereof, as shown in FIG. 5. Situated on an outer surface of each of the side faces is a pair of spaced pile fasteners 30. Each walker coupling mechanism further has a pair of spaced clamps 32 each with an inverted U-shaped configuration. Preferably, the clamps are screwably coupled at an apex thereof to the top face between the side faces of the walker coupling mechanisms. By this structure, each walker coupling mechanism is adapted to be coupled to an associated side bar of the walker via the clamps. Such coupling is effected via the biasing of the clamps.

Further provided is a tray 34 with a rectilinear configuration having a pair of long edges and a pair of short edges coupled therebetween. The tray is ideally constructed from ABS plastic. The tray further has a pair of lips 36 integrally coupled to a corresponding long edge of the tray and further depending downwardly therefrom. As best shown in FIG. 5, the tray has a tray coupling mechanism including a pair of plates 38 situated below the tray adjacent the short edges thereof. It is imperative that the width of the plates be at least the length of the oval tabs. A periphery 40 of the plates is coupled between an outboard edge and side edges of the corresponding plate and a lower surface of the tray. As such, each plate defines a compartment with access afforded only at an inboard edge thereof. Each plate has rectangular cut out 42 with a width equivalent to a diameter of the post of the walker coupling mechanism. Such cut out is in communication with the inboard edge of corresponding plate.

Figure 2:
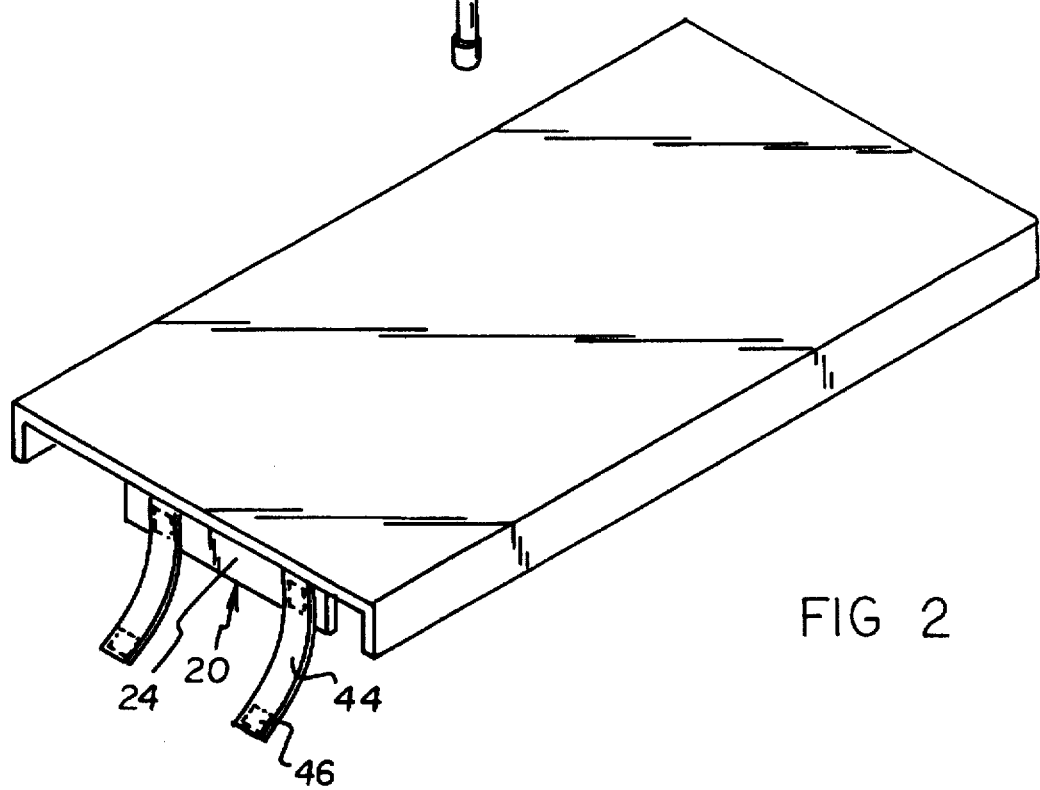
FIG. 2 is a perspective view of the tray of the present invention.
Figure 3:
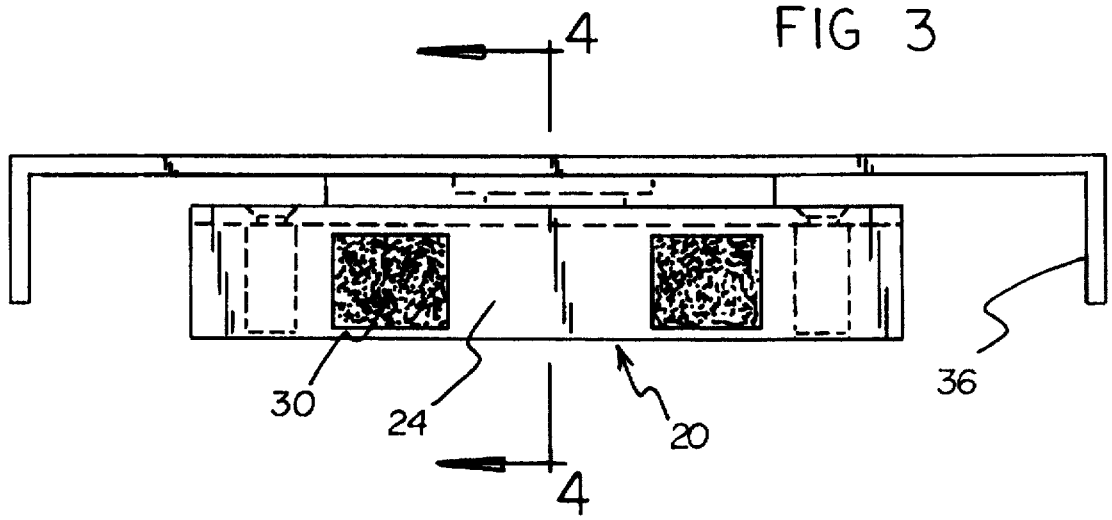
FIG. 3 is a side view of one of the walker coupling mechanisms and tray of the present invention.

As shown in FIG. 2, the tray further includes a pair of spaced flexible strips 44 coupled at a first end thereof to a corresponding short edge of the tray. A pile fastener 46 is situated on a second end of each of the strips.

In use, the oval tabs of the walker coupling mechanism may be slidably situated between the corresponding plate of the tray coupling mechanism and the tray. As such, the walker coupling mechanisms may be slidably maneuvered and spaced to accommodate a distance between the side bars of the walker. The walker coupling mechanisms may then be coupled to the corresponding side bars. To preclude lateral movement of the tray during use, the strips are situated about the corresponding side bar and the pile fasteners of are releasably coupled to the pile fasteners of the corresponding walker coupling mechanism.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved removable tray for a walker comprising, in combination:

a walker including a pair of spaced upper side bars each with a leg depending from each end thereof, the walker further having a front cross bar coupled between one pair of legs in perpendicular relation with the upper side bars;

a pair of walker coupling mechanisms each including a top face with a rectangular configuration, a pair of side faces integrally coupled to opposite edges thereof and depending downwardly therefrom thus defining an inverted U-shaped configuration, an oval tab situated above the top face with a post coupled between the tab and the top face, the side faces each having a pair of spaced pile fasteners situated on an outer surface thereof, each walker coupling mechanism further including a pair of spaced clamps each with an inverted U-shaped configuration screwably coupled at an apex thereof to the top face between the side faces thereof, whereby each walker coupling mechanism is adapted to be coupled to an associated side bar of the walker via the clamps; and a tray with a rectilinear configuration having a pair of long edges and a pair of short edges coupled therebetween, the tray further having a pair of lips integrally coupled to a corresponding long edge of the tray and further depending downwardly therefrom, the tray having a tray coupling mechanism including a pair of plates situated below the tray adjacent the short edges thereof with a periphery coupled between an outboard edge and side edges of the plate and a lower surface of the tray, each plate having rectangular cut out with a width equivalent to a diameter of the post of the walker coupling mechanism, the tray further having a pair of spaced flexible strips coupled at a first end thereof to a corresponding short edge of the tray with a pile fastener situated on a second end of each of the strips;

whereby the oval tabs of the walker coupling mechanism may be slidably situated between the corresponding plate of the tray coupling mechanism and the tray such that the walker coupling mechanisms may be slidably maneuvered to accommodate a length between the side bars of the walker and upon the walker coupling mechanisms being coupled to the corresponding side bar, the strips are situated about the corresponding side bar and the pile fasteners thereof may be releasably coupled to the pile fasteners of the corresponding walker coupling mechanism to preclude lateral movement of the tray during use.

2. A removable tray for a walker comprising:

a walker including a pair of spaced upper side bars;

a pair of walker coupling mechanisms adapted to be coupled to an associated side bar of the walker; wherein each of the walker coupling mechanisms include a top face with a rectangular configuration, a pair of side faces integrally coupled to opposite edges thereof and depending downwardly therefrom thus defining an inverted U-shaped configuration, an oval tab situated above the top face with a post coupled between the tab and the top face, each walker coupling mechanism further including a pair of spaced clamps each with an inverted U-shaped configuration screwably coupled at an apex thereof to the top face between the side faces thereof; and a tray being slidably coupled with respect to at least one of the walker coupling mechanisms for permitting only lateral relative movement;

wherein said tray has a rectilinear configuration having a pair of long edges and a pair of short edges coupled therebetween, the tray further having a pair of lips integrally coupled to a corresponding long edge of the tray and further depending downwardly therefrom;

said tray having a tray coupling mechanism including a pair of plates situated below the tray adjacent the short edges thereof with a periphery coupled between an outboard edge and side edges of the plate and a lower surface of the tray, each plate having a rectangular cut out with a width equivalent to a diameter of the post of the walker coupling mechanism.

3. A removable tray for a walker as set forth in claim 2 wherein side faces of the walker coupling mechanism each have a pair of spaced pile fasteners situated on an outer surface thereof and the tray further has a pair of spaced flexible strips coupled at a first end thereof to a corresponding short edge of the tray with a pile fastener situated on a second end of each of the strips for coupling about the side bars of the walker to preclude lateral movement of the tray during use.

* * * * *